United States Patent
Hsieh et al.

(10) Patent No.: US 8,270,755 B2
(45) Date of Patent: Sep. 18, 2012

(54) METHOD TO EVALUATE CONTRAST VALUE FOR AN IMAGE AND APPLICATIONS THEREOF

(75) Inventors: Wen-Hung Hsieh, Jubei (TW); Ching-Jung Tsai, Taichung (TW); Chih-Hung Yang, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 0 days.

(21) Appl. No.: 13/028,843

(22) Filed: Feb. 16, 2011

(65) Prior Publication Data

US 2011/0134309 A1    Jun. 9, 2011

Related U.S. Application Data

(62) Division of application No. 11/706,387, filed on Feb. 15, 2007, now Pat. No. 7,912,314.

(30) Foreign Application Priority Data

Mar. 1, 2006    (TW) ............................... 95106772 A (51) Int. Cl.
   *G06K 9/40*    (2006.01)
(52) U.S. Cl. ....................................... 382/274; 382/255
(58) Field of Classification Search .................... 396/79, 396/93, 102, 124; 359/319, 383, 410; 348/345, 348/353, 365, 603, 673, 678, 686, 745, E9.021, 348/E3.048, E5.119; 353/76; 352/139, 140; 382/255, 274; 345/617
See application file for complete search history.

(56) References Cited

U.S. PATENT DOCUMENTS

| 5,075,777 | A  * | 12/1991 | Murata ......................... 348/354 |
| 6,818,875 | B1 * | 11/2004 | Suzuki ........................ 250/201.2 |
| 7,009,642 | B2 * | 3/2006  | Hofer et al. ................. 348/226.1 |
| 2005/0212950 | A1 * | 9/2005 | Kanai ............................ 348/345 |
| 2005/0254727 | A1 | 11/2005 | Fedorovskaya |
| 2006/0221227 | A1 * | 10/2006 | Chang ............................ 348/353 |
| 2007/0216786 | A1 | 9/2007 | Hung et al. |
| 2008/0226274 | A1 * | 9/2008 | Spielberg ........................ 396/50 |

OTHER PUBLICATIONS

Olympus, 2004, Olympus Imaging Corp., Olympus C-7000 Zoom Advanced Manual, Retrieved on Aug. 16, 2004 from the Internet:<URL:http://www.olympus.co.jp/en/support/imsg/digicamera/download/manual/zoom/man_c70z_e.pdf.*

* cited by examiner

Primary Examiner — Gregory F Cunningham
(74) Attorney, Agent, or Firm — Thomas|Kayden (57) ABSTRACT

An image contrast evaluation method is disclosed. First, focusing is performed based on the contrast value of an image rendered by a lens on optical sensors, wherein the calculation of the contrast value comprises: selecting an area of the image, calculating the absolute value of brightness difference between each neighboring pixel, and selecting a specific value there from as the contrast value of the image based on a distribution of the calculated absolute values of the brightness differences.

5 Claims, 8 Drawing Sheets

METHOD TO EVALUATE CONTRAST VALUE FOR AN IMAGE AND APPLICATIONS THEREOF

RELATED APPLICATIONS

This application is a divisional of U.S. application Ser. No. 11/706,387, filed Feb. 15, 2007, (now U.S. Pat. 7,912,314), which is based on, and claims priority from, Taiwan Application Serial Number 95106772, filed Mar. 1, 2006, the disclosures of which are hereby incorporated by reference herein in their entirety.

BACKGROUND

1. Field of the Invention

The present invention relates to an image processing technology. More particularly, the present invention relates to evaluation of contrast value for an image.

2. Description of Related Art

Digital cameras have an auto focus function that ranges the distance between the object and the lens of the camera to adjust the focus length. Passive auto focus digital cameras do not need to range the distance, but utilizes the lens to capture an image that is digitalized and transformed into frequency domain. Values of the frequency domain of the digital image are critical values of resolution through which a focusing lens moves to change the focus length of an object distance so as to find a maximum critical value to present a clear picture.

A method to seek and fine focus a point is a developing issue for passive auto focus camera. The modern digital cameras use a specific digital signal processor (DSP) to process digital images. The DSP comprises a hardware component that detects and determines whether operations of auto focus are completed. However, this auto focus method still has some shortcomings. For example, if the object is a single piece of hair, the DSP generally subtracts the brightness value of each pixel of the image from one another, and calculates the average value of the differences or accumulates the differences so as to evaluate the contrast value in response to the average value or the sum. However, this method averages the contrast values by subtracting the brightness values of the pixels of the periphery of the hair, which abates specific weight in the contrast value of the pixels with large brightness differences. Therefore, the auto focus cannot be accurately and precisely performed.

SUMMARY

An object of an embodiment in accordance with the present invention is to provide a method of calculating contrast values of an image.

An embodiment of a method to calculate a contrast value of an image comprises using a lens to form an image on an image sensing member, taking a retrieving area from the image, calculating an absolute value of the brightness difference of each of pair of neighboring pixels in the retrieving area, and determining a specific value by the distribution of the absolute values and setting a contrast value of the image equal to the specific value.

An embodiment of a method to focus a camera comprises performing an auto focus operation in response to the contrast value of an image on an image sensing member formed by a lens, adopting a first method to seek and find an optimum contrast value of the image during the auto focus operation and adopting a second method to seek and find the optimum contrast value when the first method fails.

An embodiment of an image retrieving apparatus comprises an image sensing member, a lens and a processor. The image sensing member transforms light beams into electric signals. The lens forms an image on the image sensing member. The processor performs an auto focus operation in response to a contrast value of the image on the image sensing member, wherein the processor takes a retrieving area of the image, calculates an absolute value of each pair of neighboring pixels of the retrieving area, and determines the specific value that is set to be the contrast value of the image based on the distribution of the calculations of the absolute values.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 1:
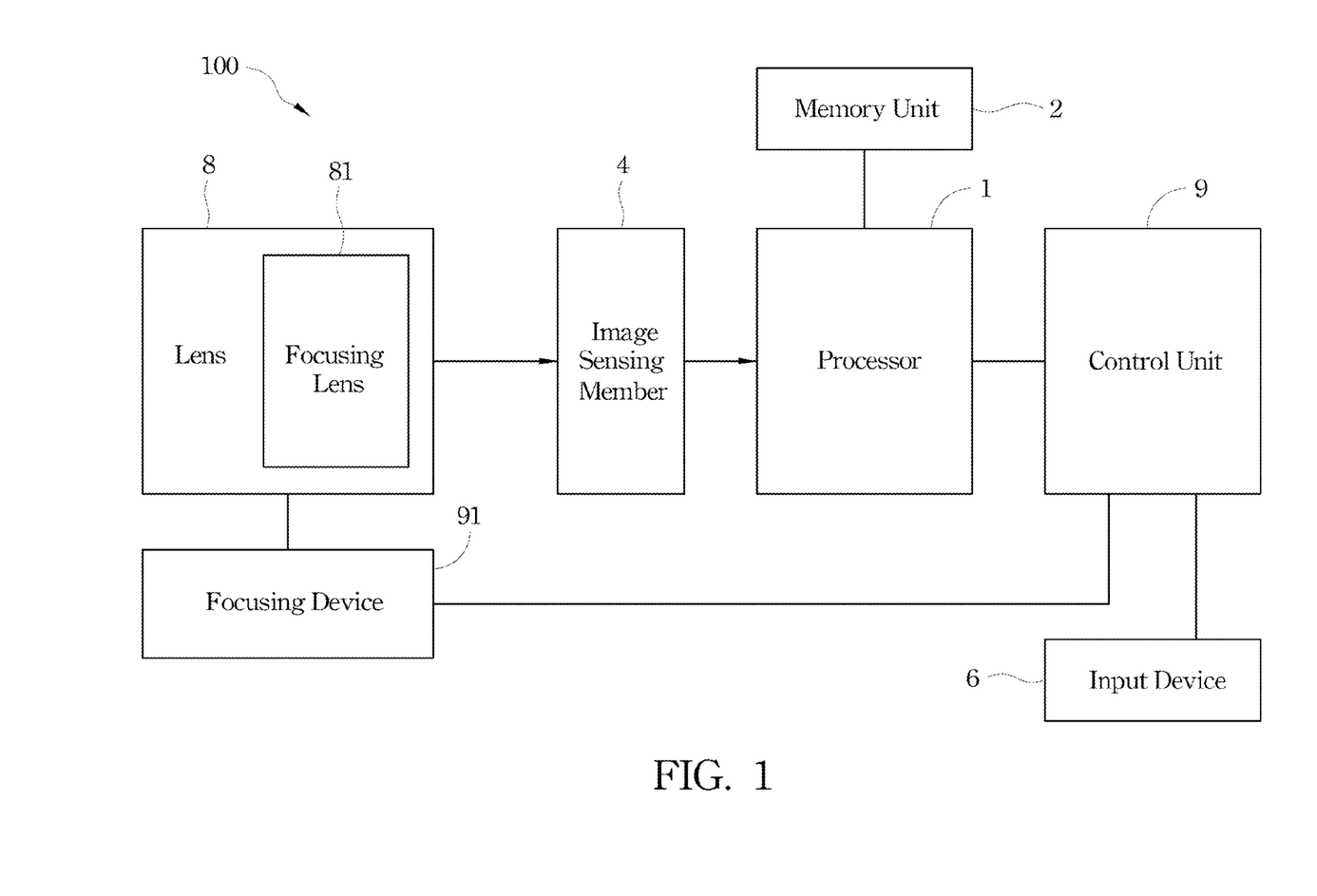
FIG. 1 is a block diagram of an embodiment of an image retrieving apparatus in accordance with the present invention.

Refer to FIG. 1. An image retrieving apparatus 100 comprises a processor 1, a memory unit 2, an image sensing member 4, an input device 6, a lens 8 and a control unit 9. The processor 1 may be a digital signal processor (DSP). The control unit 9 may be integrated within the processor 1.

The image sensing member 4 may be a Complementary Metal-Oxide Semiconductor (CMOS) or a Charge-Coupled Device (CCD). The image sensing member 4 receives the refracted light beams from the lens 8 and transforms the light beams into electric signals for the image.

The control unit 9 is coupled to a focusing device 91 to actuate and drive the focusing device 91 in response to the image information provided by the processor 1. The focusing device 91 adjusts the relative distance between the lens 8 and the image sensing member 4 to focus the camera. The control unit 9 initiates auto focus operation based on a status of the input device 6. The input device 6 may comprise a shutter releasing knob or an external switch control device of the image retrieving apparatus 100.

The lens 8 may be implemented with various kinds of lenses. The light beams pass through the lens 8, and are refracted by the lens 8 to form an image on the image sensing member 4. For example, the lens 8 may comprise multiple focusing lenses 81. The focusing device 91 may comprise mechanical parts that move the focusing lens 81 to change the relative distance between the focusing lens 81 and the image sensing member 4.

Figure 2:
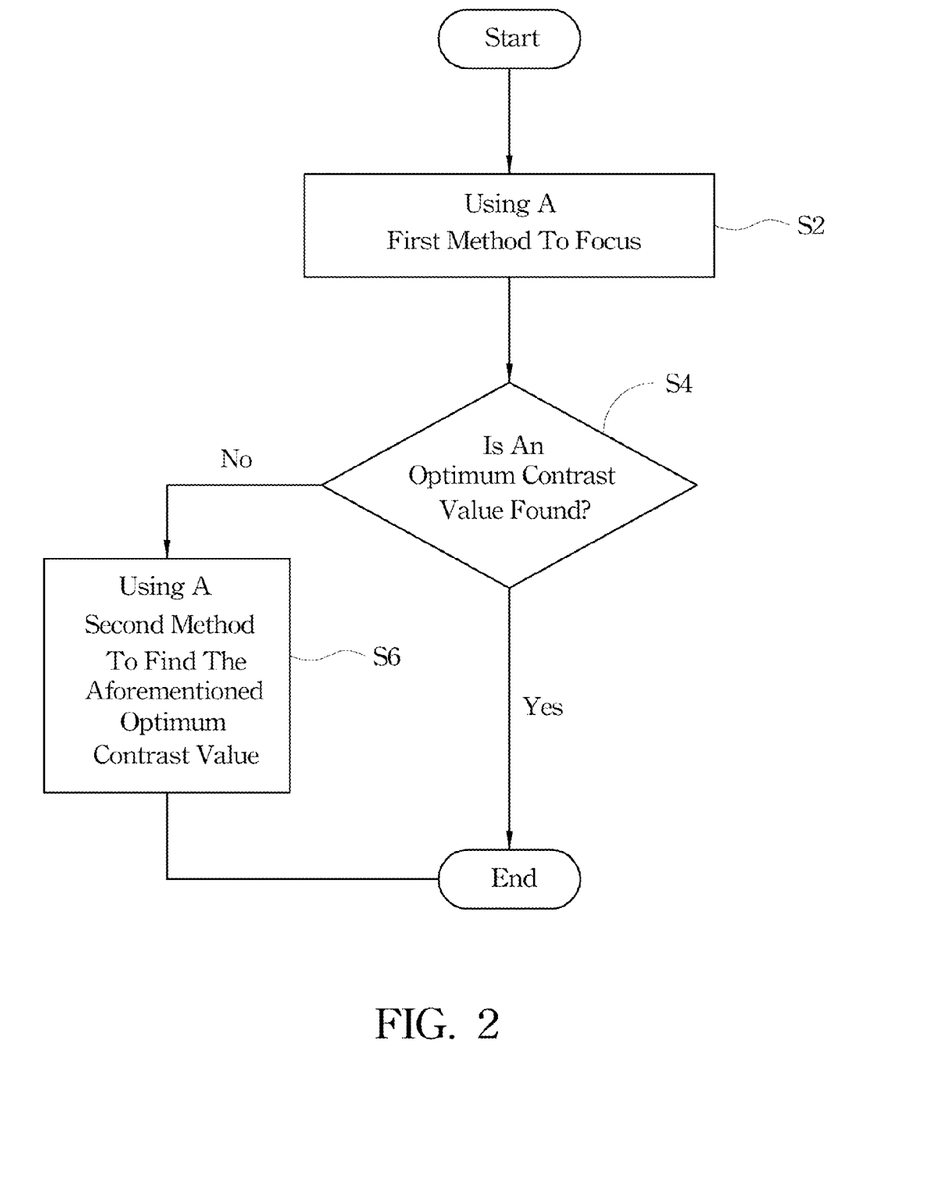
FIG. 2 is a flow chart of focusing a camera of an embodiment in accordance with the present invention.

Refer to FIG. 2. The processor 1 controls the positions of the focusing lens 81 moved by the focusing device 91 and focuses the focusing lens 81 in response to the contrast values of the image on the image sensing member 4 refracted by the lens 8.

The first method used by processor 1 initially focuses the focusing lens (as shown in step S2) and determines whether an optimum image contrast value has been successfully found (as shown in step S4) during the focusing operations. When the optimum contrast value has been found, the auto-focusing operations are complete. When the first method fails to determine the optimum image contrast value, the processor 1 uses a second method to determine the aforementioned optimum image contrast value (as shown in step S6).

The first method and the second method respectively calculate the contrast values of the image using different image areas. The first method uses entire image to calculate the contrast. The second method uses a rectangular area that is 1/25 of the image size to calculate the image contrast. For example, the rectangular area selected by the second method is a retrieving area located at the center of the image. The retrieving area has a length and a width, where the length and the width of the retrieving area are respectively 1/5 of the length and the width of the image. However, the second method may take different retrieving areas with different shapes.

Figure 3:
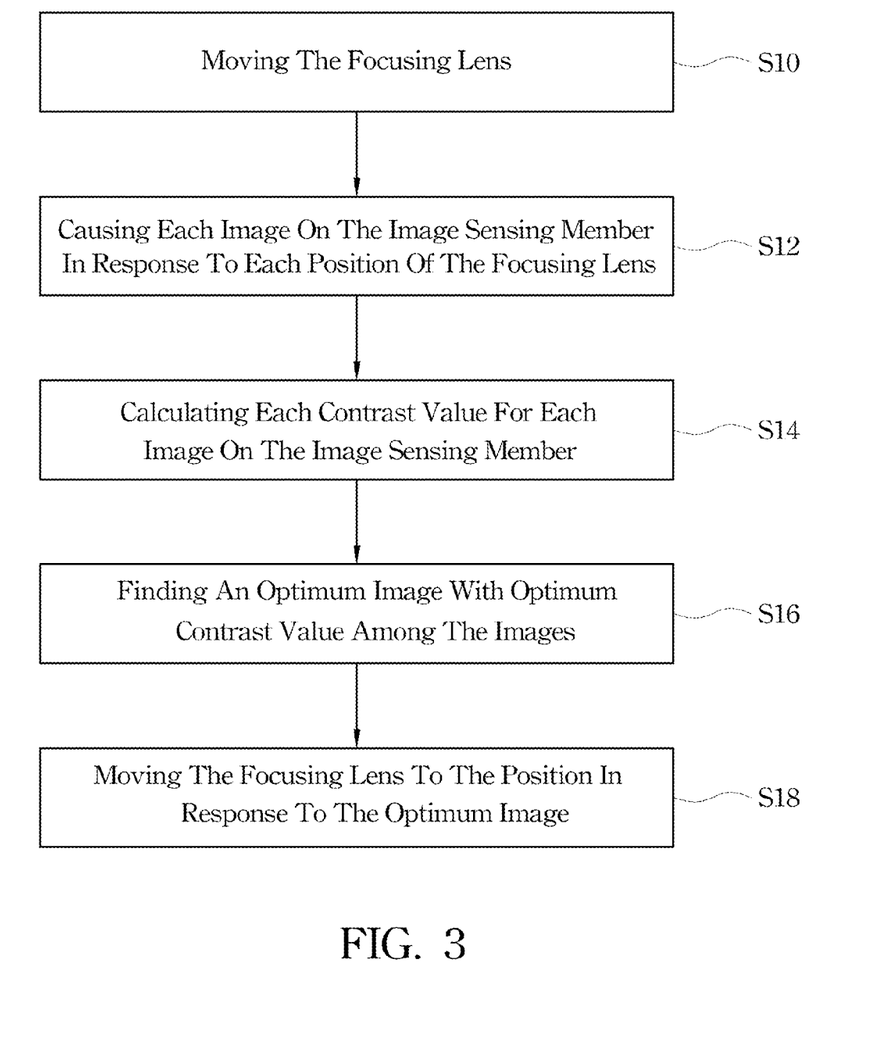
FIG. 3 is a flow chart of focusing a camera of an embodiment in accordance with the present invention.

Refer to FIG. 3. The focusing device 91 moves the focusing lens 81 in a range of movable lengths (as shown in step S10), and the image sensing member 4 catches each image in response to each position of the focusing lens (as shown in step S12). The processor 1 calculates each contrast value for each image on the image sensing member 4 (as shown in step S14), and determines an optimum image with an optimum contrast value among the images (as shown in step S16). The processor 1 controls moving the focusing lens 81 to the position in response to the optimum image (as shown in step S18). Therefore, the processor 1 focuses the camera by means of comparing the contrast values of the images formed on the image sensing member 4.

This focusing process may find a position corresponding to the optimum contrast value, the process may move the focusing lens 81 with greater precision. The embodiment adopts an interpolation method to determine the position of the absolute optimum contrast value. The interpolation method uses three contrast values including the optimum contrast value and two other sequential contrast values (the contrast values in response to the positions before and after the position corresponding to the optimum contrast value). Thereafter, the focusing lens 81 is moved to the position corresponding to the absolute optimum contrast value.

Figure 4:
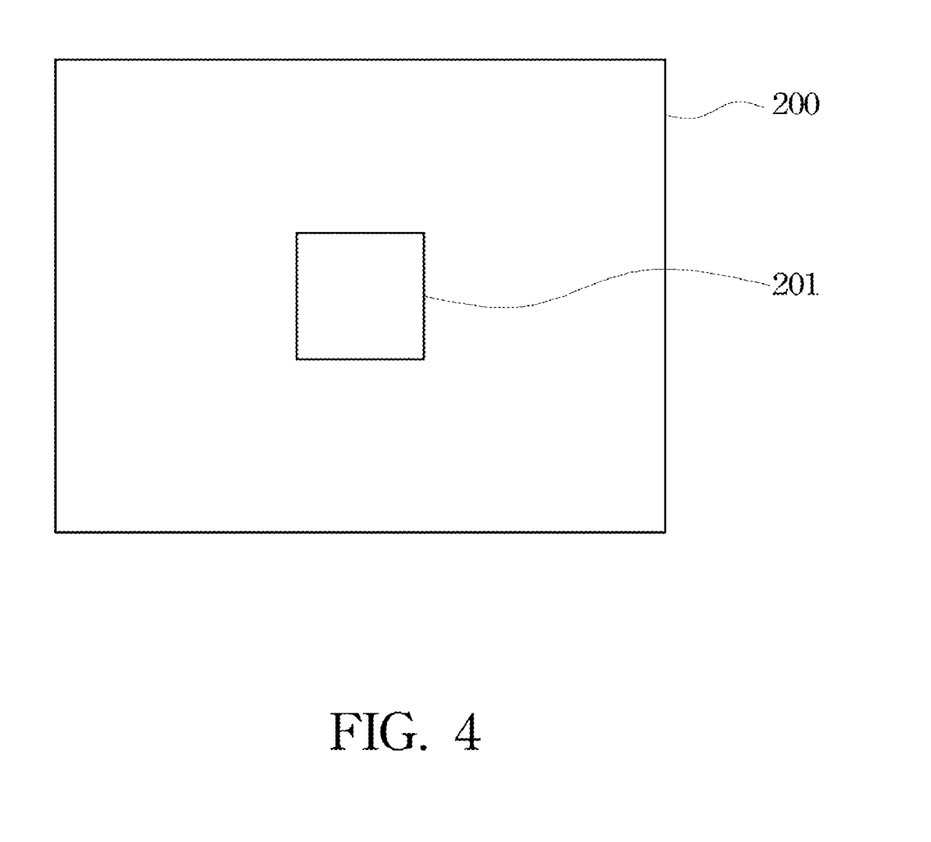
FIG. 4 is a schematic diagram of an image with a retrieving area.

Refer to FIG. 4, when the focusing lens 81 is positioned at a given position, an image 200 is formed on the image sensing member 4 (as shown in step S12). A retrieving area 201 is 1/25 of the entire area of the image 200 and is rectangular in this embodiment. For the aforementioned second method, the processor 1 takes information of the retrieving area 201 from the image 200, and determines a specific absolute value of the brightness difference to be a contrast value of the image by the distribution of the absolute values of brightness differences between neighboring pixels of the retrieving area 201.

Figure 5:
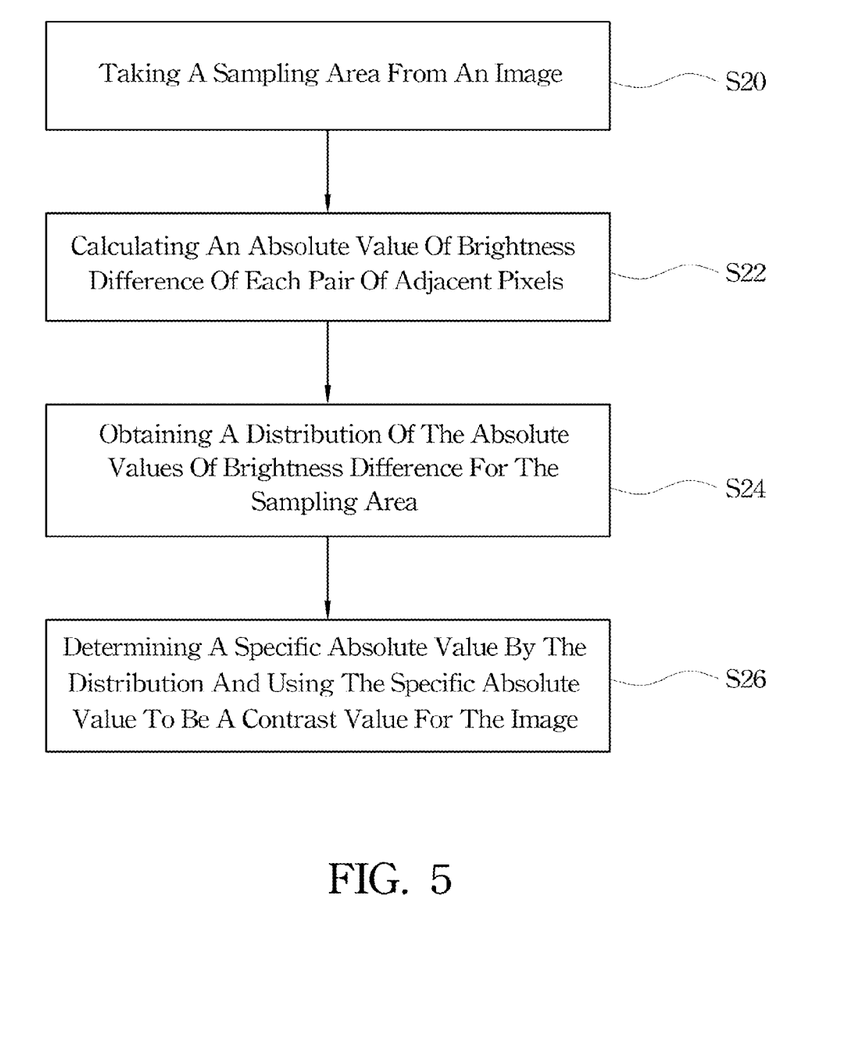
FIG. 5 is a flow chart of focusing a camera of another embodiment in accordance with the present invention.

Refer to FIG. 5, the processor 1 takes the retrieving area 201 from the image 200 (as shown in step S20), and calculates an absolute value of brightness difference of each pair of neighboring pixels and records the absolute values (as shown in step S22). Thus, the processor 1 obtains a statistical distribution of the absolute values of the brightness difference for the retrieving area 201 by calculations (as shown in step S24). Hence, the processor 1 determines the specific absolute value of brightness difference, and uses the specific absolute value to be the contrast value for the image 200 (as shown in step S26).

Figure 6:
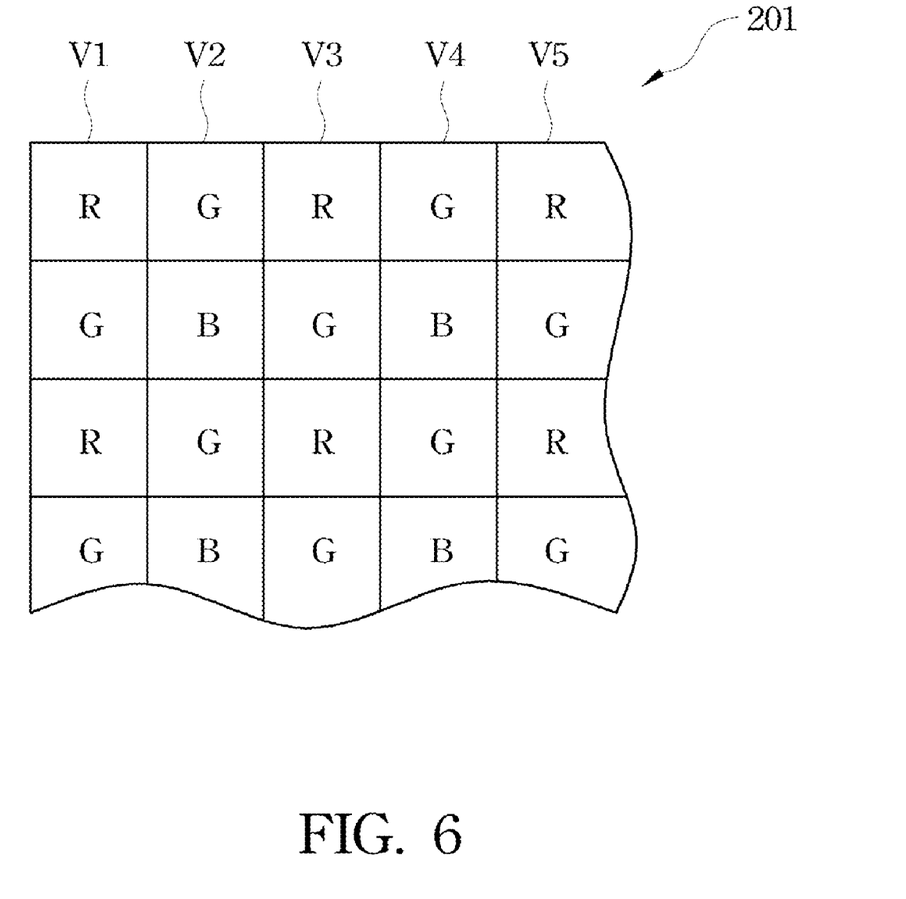
FIG. 6 is a schematic diagram of pixel distribution of a retrieving area of the image in FIG. 4.

To illustrate the method of obtaining a distribution of the absolute values of brightness differences, the embodiment provides an example as follows. When the image 200 complies with the Bayer pattern, its distribution of the absolute values of brightness difference can be obtained by calculating an absolute value of brightness difference of each pair of neighboring pixels with identical colors in the retrieving area 201. The processor 1 categorizes and statistically analyzes the calculated results to obtain the distribution. Refer to FIG. 6. All pixel v1, pixel v3 and pixel v5 are red, and both pixel v2 and pixel v4 are green. The processor 1 calculates the absolute value of brightness difference between pixel v1 and pixel v3, and categorizes the result. Likewise, the processor 1 calculates respectively the absolute values of brightness difference between the pixel v2 and the pixel v4, between pixel the v3 and the pixel v5, etc. and categorizes respectively the results. Thus, the distribution of the absolute values of brightness difference could be obtained when the calculations for the absolute values of the pairs of neighboring pixels with identical color of the retrieving area 201 are completed.

Figure 7:
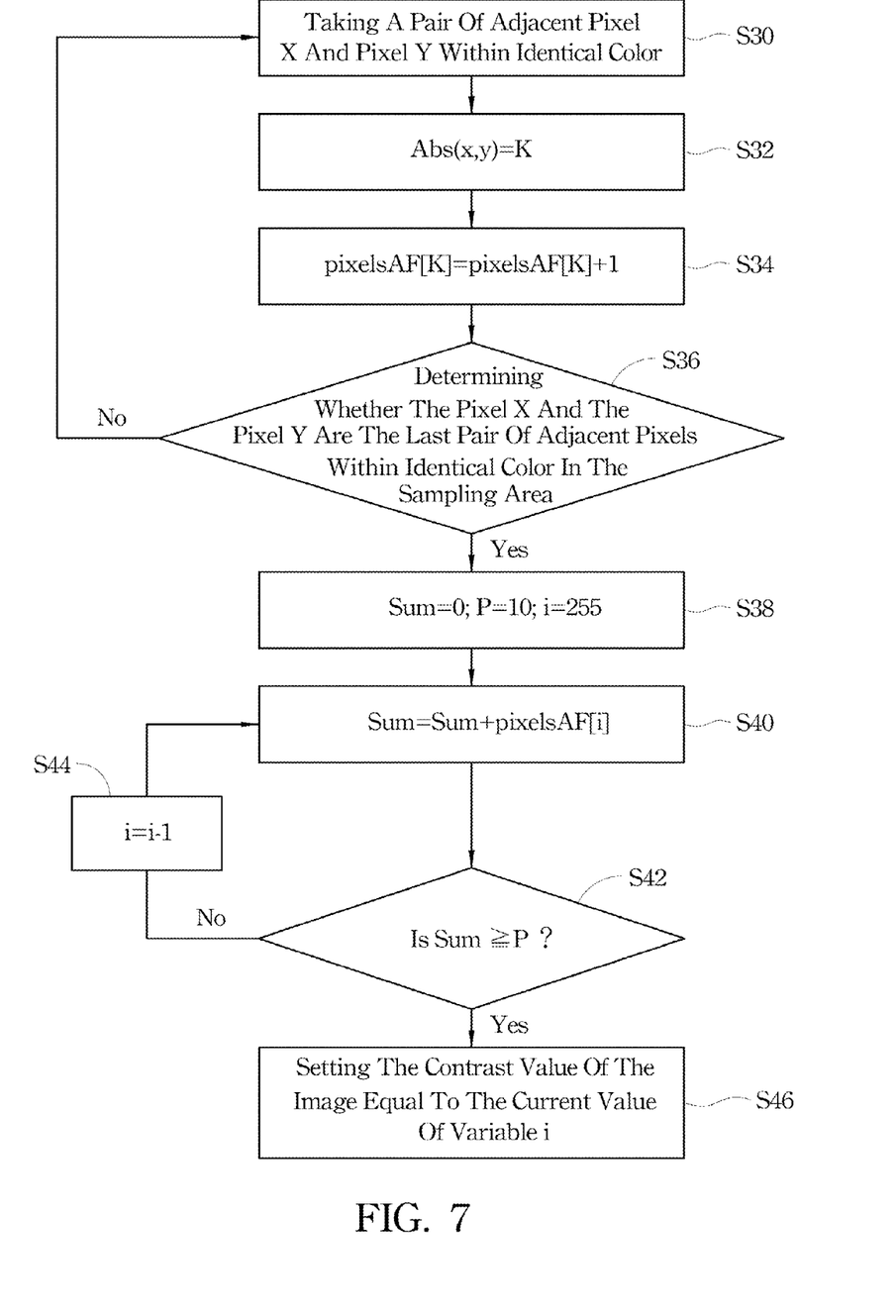
FIG. 7 is a flow chart of determining contrast value of the image.

For further description, the processor 1 subtracts the brightness value of one pixel (minuend) from another pixel (subtrahend) that is neighboring to and has identical color with the minuend pixel, and takes the absolute value of the difference of the pixels. The absolute values of brightness differences are recorded into an array called pixelsAF[ ]. Initial values of the array elements, pixelsAF[0] to pixelsAF[255], of the array pixelsAF[ ] are set to zero. Function Abs(x, y) denotes the absolute value of brightness difference of neighboring pixel x and pixel y that are in identical color. Refer to FIG. 7, the processor 1 takes a pair of neighboring pixel x and pixel y within identical color (as shown in step S30). The processor 1 calculates the absolute value K of the brightness difference between pixel x and pixel y with Function Abs(x, y) (as shown in step S32). If the absolute value K is a positive integer, the processor 1 writes the absolute value K into array pixelsAF[K], and adds the current pixelsAF[K] with one (1). For example, if there are two neighboring pixels v1 and pixel v3 within identical colors in the retrieving area 201, and the absolute value of brightness difference is Abs(v1, v3)=K=255, then, adding the value of the array element pixelsAF[255] with one (1). Likewise, if the absolute value of brightness difference is Abs(v2, v4)=K=230, then adding the value of the array element pixelsAF[230] with one (1).

Figure 8:
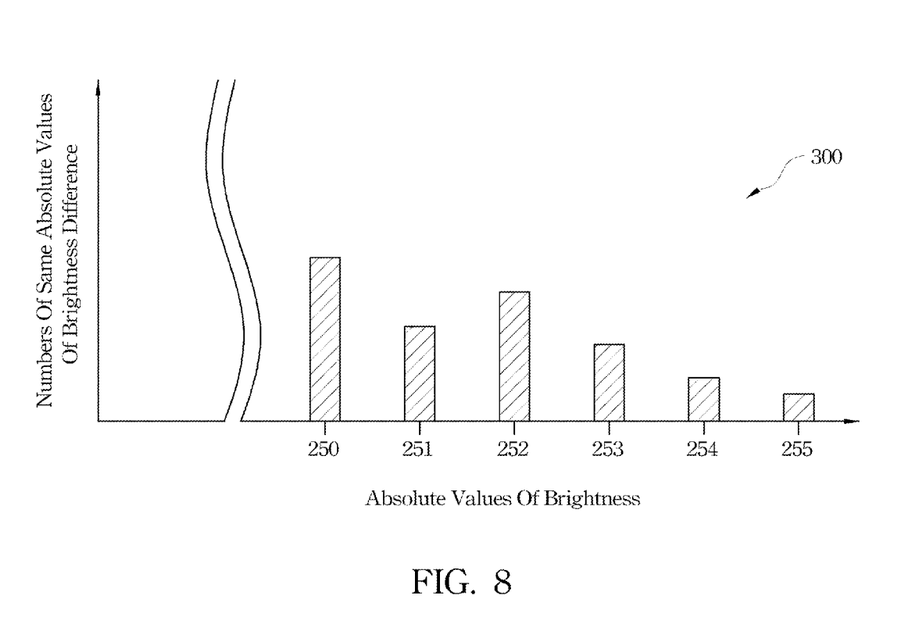
FIG. 8 illustrates a histogram of a distribution of absolute values of brightness difference of pairs of neighboring pixels.

The processor 1 determines whether the pixel x and the pixel y are the last pair of neighboring pixels within identical color in the retrieving area 201 (as shown in step S36). If they are not, then the system returns to step S30 to calculate another pair of neighboring pixels with an identical color. If they are, then the system goes to the step S38. After completing the calculations, the number of same value of the function Abs (x,y) could be immediately known. Fro example, if there are two absolute values of brightness difference by the function Abs(x, y) being the same, and are equal to 255, i.e. Abs(x, y)=255, then recording the array element pixelsAF[255]=2. Likewise, if there are four absolute values of brightness difference by the function Abs(x, y) being the same, and are equal to 254, i.e. Abs(x, y)=254, then recording the array element pixelsAF[254]=4. Therefore, a distribution 300 of the absolute values of brightness difference relative to the numbers of the same absolute values of brightness difference as shown in FIG. 8.

The processor 1 accumulates the numbers that have the same absolute values of brightness difference from the maximum absolute value to the minimum maximum absolute value. Initial value of the accumulation Sum is set to zero (Sum=0). When the value of Sum is equal to or larger than a pre-determined number P after adding a number of same absolute values of brightness differences, the processor 1 sets the contrast value of the image 200 to be the absolute value of brightness difference. In this embodiment, as shown in step S38, the number P is equal to ten (10) and the variable i is pre-configured to 255, i.e. i=255. Accumulating operation is Sum=Sum+pixelsAF[i] (as shown in step S40). If the value of Sum is equal to or larger than the number P (as shown in step S42), then the processor 1 sets the contrast value of the image 200 to be the absolute value of the brightness difference in response to the latest accumulated numbers of same absolute value of brightness difference. Otherwise, the variable i is subtracted from 1, i.e. i=i−1 (as shown in step S44), and returned to the step S40. For example, when the variable i is equal to 253 and the Sum is equal to or larger than ten (10), then the processor 1 sets the contrast value of the image to 253.

Consequently, using the aforementioned methods to the contrast values of several different positions, a maximum contrast value can be determined. Thus, moving the focusing lens 81 to the position corresponding to the maximum value completes the auto focusing operation.

Calculations of the contrast values of the image by the aforementioned methods do not use averaging calculations, but calculates the absolute value of actual brightness difference of pairs of neighboring pixels within identical color, and analyzes statistically a distribution of the absolute values of brightness difference of the image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method to focus a camera, and the method comprising: using a processor to perform the steps of:
performing a focus operation in response to a contrast value of an image on an image sensing member formed by a lens;
adopting a first method to seek and find an optimum contrast value of the image during the focus operation; and
adopting a second method to seek and find the optimum contrast value when the first method fails, wherein the first method is not equal to the second method.

2. The method as claimed in claim 1, wherein the first method and the second method take respectively different areas of the image to handle seeking and finding the optimum contrast value.

3. The method as claimed in claim 1, wherein the second method takes a retrieving area from the image and calculates an absolute value of brightness difference of each pair of neighboring pixels of the retrieving area to determine a specific value that is set to be the contrast value of the image.

4. The method as claimed in claim 3, wherein the retrieving area is a rectangular area located in a central area of the image, and a width and a length of the rectangular area are respectively ⅕ of a width and a length of the image.

5. The method as claimed in claim 3, wherein the first method takes a first area A from the image, the second method takes a second area B from the image, and the first area A is not equal to the second area B.

* * * * *